(12) United States Patent
Pai et al.

(10) Patent No.: US 7,042,362 B2
(45) Date of Patent: May 9, 2006

(54) APPARATUS FOR MONITORING LEAKAGE OF PROCESS COOLING WATER IN FURNACE

(75) Inventors: Jiun-Rong Pai, Taichung Hsien (TW); Yung-Hsin Lo, Hsinchu Hsien (TW); Hong-Chih Wu, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 184 days.

(21) Appl. No.: 10/694,355

(22) Filed: Oct. 28, 2003

(65) Prior Publication Data

US 2004/0250607 A1    Dec. 16, 2004

(30) Foreign Application Priority Data

Jun. 10, 2003    (TW) ............................... 92115753 A

(51) Int. Cl.
    *G08B 21/00*    (2006.01)
(52) U.S. Cl. ...................... 340/605; 340/620; 137/312; 137/386; 110/193
(58) Field of Classification Search ........ 340/604–606; 73/61.76, 61.41, 861
    See application file for complete search history.

(56) References Cited

U.S. PATENT DOCUMENTS

| | | | | |
|---|---|---|---|---|
| 3,069,671 A | * | 12/1962 | Taylor | ......................... 340/616 |
| 4,805,662 A | * | 2/1989 | Moody | ......................... 137/312 |
| 5,086,829 A | * | 2/1992 | Asakawa | ..................... 165/270 |
| 5,188,143 A | * | 2/1993 | Krebs | ......................... 137/312 |
| 5,663,489 A | * | 9/1997 | Thungstrom et al. | ........ 73/40.7 |
| 5,756,880 A | * | 5/1998 | Chen et al. | .................... 73/40 |
| 6,305,406 B1 | * | 10/2001 | Ståhl et al. | ................. 137/312 |
| 6,550,499 B1 | * | 4/2003 | Pai | ............................. 138/104 |

FOREIGN PATENT DOCUMENTS

| | | |
|---|---|---|
| TW | 494206 | 7/1991 |
| TW | NP-1566 | 7/1991 |

* cited by examiner

*Primary Examiner*—Jeffery Hofsass
*Assistant Examiner*—Eric Blount

(57) ABSTRACT

A method and an apparatus thereof for monitoring leakage of process cooling water (PCW) in a furnace. In the method, a bellows used to deliver the process cooling water is covered by a protecting tubing, so as to protect the bellows from being corroded by the process environment and to control the flow direction of the cooling water leaking from the bellows, thus avoiding the cooling water sprinkling. In addition, a tray is installed under the bellows to receive the leaking cooling water, so as to prevent the leaking cooling water from spilling on wafers. Besides, sensors are installed in the tray to send a signal while the cooling water falling on the tray.

13 Claims, 2 Drawing Sheets

APPARATUS FOR MONITORING LEAKAGE OF PROCESS COOLING WATER IN FURNACE

FIELD OF THE INVENTION

The present invention relates to an apparatus for monitoring leakage of process cooling water (PCW) in a furnace, and more particularly, to and an apparatus for immediately monitoring leakage of process cooling water in a furnace and preventing the leaking process cooling water from sprinkling on wafers.

BACKGROUND OF THE INVENTION

In the semiconductor processes for forming films, the growth procedure, the anneal procedure, the diffusion procedure, and the baking procedure, etc., all need to perform a thermal treatment under a thermal environment. Therefore, the application of the thermal treatment step in the semiconductor processes is very common. Presently, the thermal treatment step can be typically performed in a batch type furnace or a single-wafer type rapid heater.

Referring to FIG. 1, FIG. 1 illustrates a schematic diagram of a conventional furnace. In a furnace 100, an O-ring (not shown) located on a manifold 110 will deteriorate under high temperature. Hence, a pipeline under the O-ring in the manifold 110 is used to allow process cooling water to flow through so as to lower the temperature of the O-ring. The process cooling water is injected into the pipeline in the manifold 110 from a bellows 102, and after the process cooling water flows through the entire pipeline, the process cooling water is drained out from a bellows 104. High-temperature resistant metal is typically adopted as the material forming the bellows 102 and the bellows 104 for furnace process.

The knurl portions of the bellows 102 and the bellows 104 are thinner for bending capability, so that the knurl portions are weakest in the entire bellows suture. When there is corrosion gas, such as chlorine etc., or other rusting gas in the process environment, the knurl portions of the bellows structure will be corroded, thus causing the cracks of the bellows. The cracks of the bellows will leak the process cooling water to contaminate process. Because there are many metal impurities and particles in the process cooling water, these metal impurities and particles will fall on the wafer 108 with the leaking of the process cooling water. After a thermal treatment step, the process cooling water evaporates, and the metal impurities and particles in the process cooling water adhere on the wafer 108, thus greatly lowering process yield and seriously degrading the quality of devices.

SUMMARY OF THE INVENTION

An objective of the present invention is to provide an apparatus for monitoring leakage of process cooling water in a furnace by covering a protecting tubing on the bellows, thereby preventing the bellows from chemical corrosion in the process environment, controlling the flow direction of the leaking process cooling water, and preventing the sprinkling phenomenon of the process cooling water.

Another objective of the present invention is to provide an apparatus for monitoring leakage of process cooling water in a furnace by installing a tray under the bellows. The tray comprises a shelter plate, an anti-leak dish, and a sensor installed on the anti-leak dish, thereby preventing the leaking process cooling water from sprinkling on the wafers and detect the signal of leakage of the process cooling water immediately.

According to the aforementioned objectives of the present invention, the present invention provides an apparatus for monitoring leakage of process cooling water in a furnace, suitable for use in preventing the process cooling water from leaking onto a plurality of wafers desired to enter the furnace, wherein the furnace comprises a bellows used to deliver the process cooling water, and the apparatus for monitoring leakage of the process cooling water comprises: a tray under the bellows, wherein the tray comprises: an anti-leak dish, which can receive the process cooling water in leaking; and a shelter plate obliquely connecting to a side of the anti-leak dish, wherein the shelter plate can block the process cooling water sprinkling toward the wafers.

According to a preferred embodiment of the present invention, the apparatus for monitoring leakage of the process cooling water further comprises a protecting tubing covering the bellows; and a sensor located on the anti-leak dish.

Because the protecting tubing covering the bellows can be used to avoid the bellows from being corroded and to control the flow direction of the leaking process cooling water; and additionally, the tray not only can receive the leaking process cooling water but also can avoid the leaking process cooling water sprinkling on the wafers; and the sensor on the anti-leak dish can send a signal immediately while the process cooling water leaking, the process cooling water can be prevented from falling onto the wafers, and the objective of effectively monitoring leakage of the process cooling water can thus be achieved.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 3:
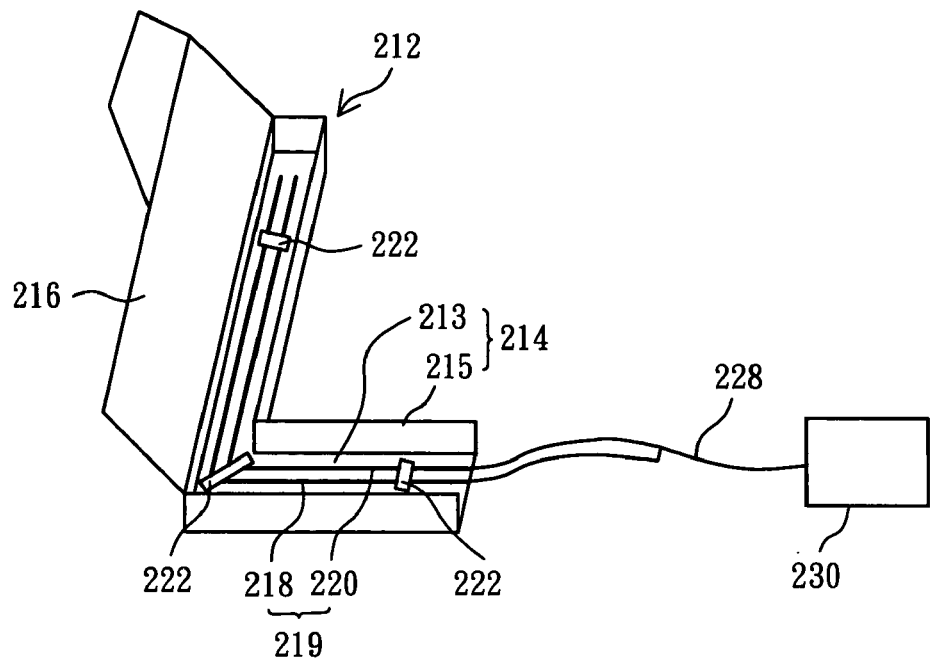
FIG. 3 illustrates a 3-D diagram of a tray in accordance with a preferred embodiment of the present invention.
Figure 4:
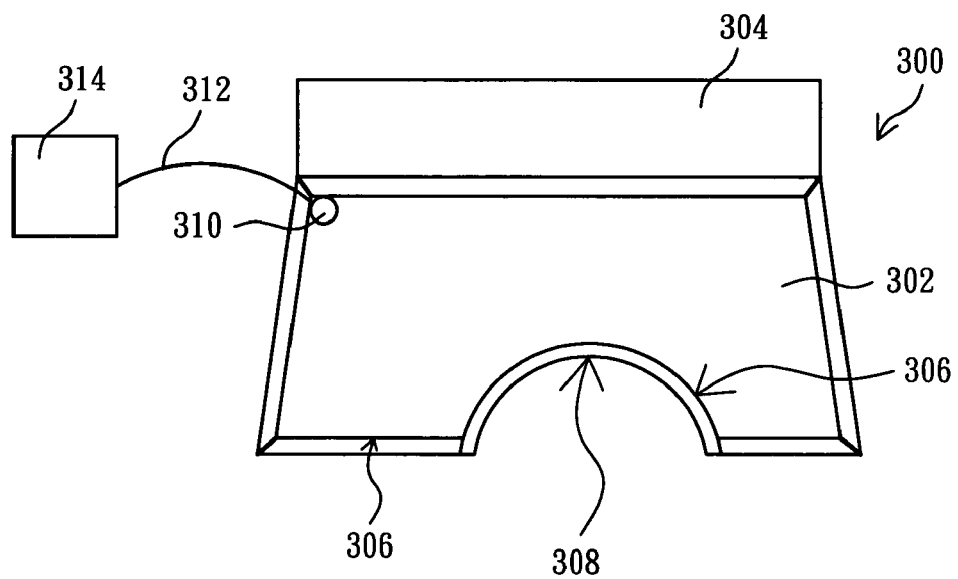
FIG. 4 illustrates a 3-D diagram of a tray in accordance with another preferred embodiment of the present invention.

The present invention discloses an apparatus for monitoring leakage of process cooling water in a furnace, thereby avoiding the process cooling water sprinkling, prolonging the lifetime of the bellows, preventing the leaking process cooling water from falling onto the wafers, and obtaining the signal of the leakage of the process cooling water in time. In order to make the illustration of the present invention more explicitly and completely, the following description and the drawings from FIG. 2 to FIG. 4 are stated.

Figure 1:
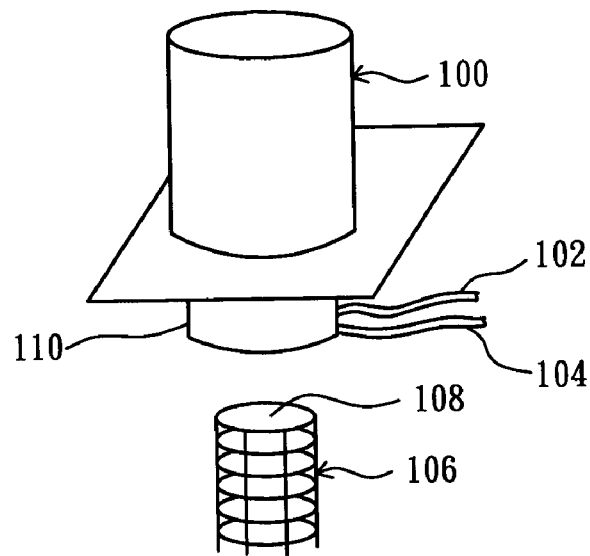
FIG. 1 illustrates a schematic diagram of a conventional furnace.
Figure 2:
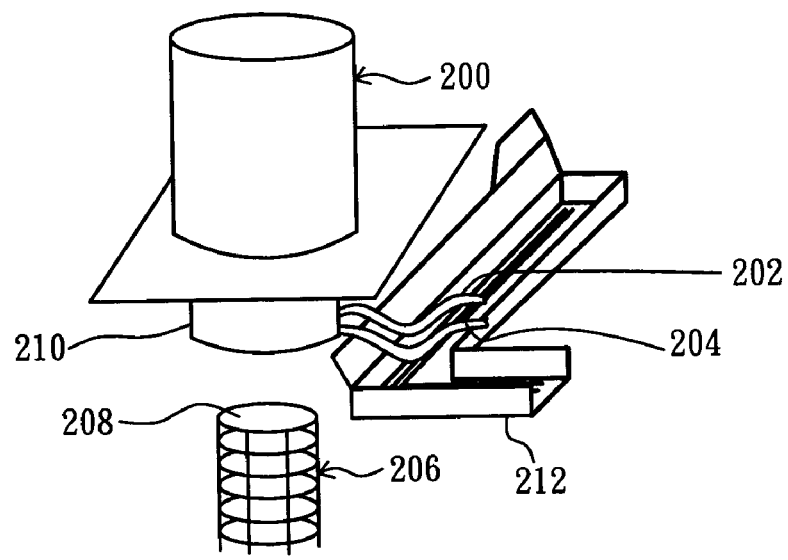
FIG. 2 illustrates a schematic diagram of a furnace in accordance with a preferred embodiment of the present invention.

Referring to FIG. 2, FIG. 2 illustrates a schematic diagram of a furnace in accordance with a preferred embodiment of the present invention. In a furnace 200, an O-ring (not shown) is located on a manifold 210. Because the O-ring will deteriorate under high temperature, an internal pipeline under the O-ring in the manifold 210 is used to allow the process cooling water therein to flow through so as to lower the temperature of the O-ring. The process cooling water used to lower the temperature of the O-ring is injected into the internal pipeline in the manifold 210 from a bellows 202, and after the process cooling water flows through the internal pipeline, the process cooling water is drained out from a bellows 204. Metal is typically adopted as the material of the bellows 202 and the bellows 204 for furnace process.

In the present invention, the bellows 202 and the bellows 204 are completely covered by a protecting tubing, wherein the protecting tubing can be a heat-shrinkable tubing or a teflon tubing. In the process environment, there may be chlorine or rusting gas existing, and the protecting tubing can protect the bellows 202 and the bellows 204 from being corroded, so as to prolong the life of the bellows 202 and the bellows 204. Besides, the protecting tubing covering the bellows 202 and the bellows 204 can guide the flow direction of the leaking process cooling water so as to make the leaking process cooling water be drained out from two ends of the protecting tubing when the bellows 202 and the bellows 204 crack. Therefore, the leaking process cooling water can be prevented from directly sprinkling out to spray on the wafer 208 carried by the boat 206 under the manifold 210.

In addition, a tray 212 is installed under the bellows 202 and the bellows 204 to receive the process cooling water leaking from the bellows 202 and the bellows 204. Referring to FIG. 3, FIG. 3 illustrates a 3-D diagram of a tray in accordance with a preferred embodiment of the present invention. The tray 212 is suitable for use in an atmospheric pressure (AP) furnace. The tray 212 comprises an anti-leak dish 214, a shelter plate 216, and a sensor 219 composed of a conductive line 218 and a conductive line 220, wherein the material of the anti-leak dish 214 and the material of the shelter plate 216 are stainless steel preferably. A sidewall 215 of the anti-leak dish 214 is connected to a side of a bottom 213, and the shelter plate 216 is obliquely connected to the sidewall 215 of the anti-leak dish 214. The conductive line 218 and the conductive line 220 are fixed on the bottom 213 of the anti-leak dish 214 by several fixed devices 222, wherein the conductive line 218 and the conductive line 220 are separated from each other and are non-electrically connected. The conductive line 218 and the conductive line 220 are gathered to form a conductive line 228, and then the conductive line 228 is connected to a detector 230. The detector 230 is used to detect leakage of water, and the detector 230 can be such as a water leak detector provided by OMRON Co., Ltd. Besides, a warning device, such as a warning light or an alarm, can further be connected to the detector 230, and the detector 230 sends a warning signal to the warning device, and the warning device sends an alarm while detecting leakage of the process cooling water.

When the process cooling water leaks from the bellows 202 and the bellows 204, the shelter plate 216 can block the process cooling water sprinkling toward the wafer 208 and make the process cooling water flow to the bottom 213 of the anti-leak dish 214 along the shelter plate 216. Besides, the anti-leak dish 214 can also receive the process cooling water falling thereon. When the process cooling water falls on the bottom 213 of the anti-leak dish 214, the conductive line 218 and the conductive line 220 are electrically conducted to form a short circuit with the medium of the process cooling water, and a signal is sent to the detector 230 through the conductive line 228. When the detector 230 receives the signal sent by the sensor, the detector 230 sends a warning signal to the warning device, and then the warning device send an alarm. Therefore, workers on-line can be informed of leakage of the process cooling water, and then pause the process to perform repairs or changes. Therefore, the process cooling water can be prevented from influencing the quality of many batches of wafers, so as to lower the impact from the leakage of the process cooling water effectively.

Referring FIG. 4, FIG. 4 illustrates a 3-D diagram of a tray in accordance with another preferred embodiment of the present invention. The tray 300 is suitable for use in a low pressure (LP) furnace. The tray 300 comprises an anti-leak dish 302, a shelter plate 304, and a sensor (not shown) located in a drainage hole 310, wherein the material of the anti-leak dish 302 and the material of the shelter plate 304 are preferably stainless steel. The shelter plate 304 is obliquely connected to a side of the anti-leak dish 302, and the anti-leak dish 302 has a concave part 308 for benefiting the installation. When water falling on the shelter plate 304, the water flows to the anti-leak dish 302 along the shelter plate 304. The anti-leak dish 302 has a ring-type protuberance 306 located near the edge of the anti-leak dish 302 for preventing the process cooling water falling on the anti-leak dish 302 from pouring out. The drainage hole 310 can be used to drain out the process cooling water on the anti-leak dish 302. When the process cooling water enters the drainage hole 310, the sensor sends a single to a detector 314 through a conductive line 312, which is electrically connected to the sensor. Then, the detector 314 sends a warning signal to an external warning device, and the external warning device sends an alarm.

One feature of the present invention is to install a tray under the bellows, so as to block the sprinkling process cooling water; receive the leaking process cooling water; and detect leakage of the process cooling water to monitor leakage of the process cooling water effectively.

It is worthy to be noted that various amendments can be made to the tray of the present invention according to the varieties of the furnaces. The tray of the present invention is essentially composed of a shelter plate, an anti-leak dish, and a sensor, as long as the tray can provide functions of anti-leak and sensing leakage. Thus, the structure and the shape of the tray are not limited in the present invention.

According to the aforementioned description, one advantage of the present invention is that: because a tray installed under a bellows used to deliver the process cooling water can block the process cooling water sprinkling from the bellows and can receive the leaking process cooling water, the present invention can prevent the leaking process cooling water from sprinkling on the wafers, and can increase the process reliability and the product yield.

According to the aforementioned description, another advantage of the present invention is that: because a tray having a sensor is installed under bellows, a warning signal can be sent by the sensor to monitor leakage of the process cooling water immediately, when the leaking process cooling water falling on the tray. Hence, the status of the process machine can be immediately known and the right judgment can be made, thereby reducing the loss of products.

According to the aforementioned description, still another advantage of the present invention is that: because a protecting tubing is covered a bellows completely, the present invention not only can prevent the bellows from being corroded by the chemistry in the process environment so as to prolong the life of the bellows, but also can control the flow direction of the leaking process cooling water of the bellows so as to achieve the objective of preventing the process cooling water from sprinkling.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. An apparatus for monitoring and preventing leakage of process cooling water in a furnace, wherein a bellows is used to deliver the process cooling water and is covered with a protective tubing, and comprises:
   a tray under the bellows, wherein the tray comprises:
   an anti-leak dish, wherein the anti-leak dish can receive the process cooling water in leaking and drained out from two ends of the protective tubing; and
   a shelter plate obliquely connecting to a side of the anti-leak dish, wherein the shelter plate can block the process cooling water sprinkling toward wafers.

2. The apparatus for monitoring and preventing leakage of the process cooling water according to claim 1, wherein the bellows is a metal bellows.

3. The apparatus for monitoring and preventing leakage of the process cooling water according to claim 1, wherein the protective tubing is a heat shrinkable tubing.

4. The apparatus for monitoring and preventing leakage of the process cooling water according to claim 1, wherein the protective tubing is a teflon tubing.

5. The apparatus for monitoring and preventing leakage of the process cooling water according to claim 1, wherein the material of the anti-leak dish is stainless steel.

6. The apparatus for monitoring and preventing leakage of the process cooling water according to claim 1, wherein the material of the shelter plate is stainless steel.

7. The apparatus for monitoring and preventing leakage of the process cooling water according to claim 1, further comprises a sensor located on the anti-leak dish, wherein the sensor can send a signal while the process cooling water is leaking on the anti-leak dish.

8. The apparatus for monitoring and preventing leakage of the process cooling water according to claim 7, wherein the sensor comprises two conductive lines which are not electrically connected normally, and the conductive lines are electrically connected and send the signal while the process cooling water in leaking iscontacting the conductive lines.

9. The apparatus for monitoring and preventing leakage of the process cooling water according to claim 7, further comprises a detector electrically connecting to the sensor, wherein the detector can receive the signal sent by the sensor and send a warning signal.

10. An apparatus for monitoring and preventing leakage of process cooling water in a furnace comprises:
   a bellows used to deliver the process cooling water and covered with a protecting tubing;
   a tray under the bellows, wherein the tray comprises:
   an anti-leak dish, wherein the anti-leak dish can receive the process cooling water in leaking and drained out from two ends of the protective tubing; and
   a shelter plate obliquely connecting to a side of the anti-leak dish, wherein the shelter plate can block the process cooling water sprinkling toward wafers;
   a sensor located on the anti-leak dish, wherein the sensor comprises two conductive lines which are fixed on a bottom of the anti-leak dish and are not electrically connected normally, and the conductive lines are electrically connected and send a signal while the process cooling water is leaking on the anti-leak dish and contacting the conductive lines; and
   a detector electrically connecting to the sensor, wherein the detector can receive the signal sent by the sensor and send a warning signal.

11. The apparatus for monitoring and preventing leakage of the process cooling water according to claim 10, wherein the protective tubing is a heat-shrinkable tubing or a teflon tubing.

12. The apparatus for monitoring and preventing leakage of the process cooling water according to claim 10, wherein the material of the anti-leak dish is stainless steel.

13. The apparatus for monitoring and preventing leakage of the process cooling water according to claim 10, wherein the material of the shelter plate is stainless steel.

* * * * *